United States Patent [19]
Benesh et al.

[11] 4,081,629
[45] Mar. 28, 1978

[54] SNAP-IN BRACKET FOR MOUNTING A TELEPHONE DIAL WITHIN A TELEPHONE HOUSING

[75] Inventors: James Owen Benesh; Donald Eric Still, both of Indianapolis, Ind.

[73] Assignee: Bell Telephone Laboratories, Incorporated, Murray Hill, N.J.

[21] Appl. No.: 735,990

[22] Filed: Oct. 27, 1976

[51] Int. Cl.[2] .............................................. H04M 1/02
[52] U.S. Cl. .................................. 179/178; 179/100 R
[58] Field of Search ........... 179/100 R, 100 D, 100 C, 179/103, 147, 178, 179

[56] References Cited

U.S. PATENT DOCUMENTS

| 3,339,960 | 9/1967 | Gee | 179/178 |
|---|---|---|---|
| 3,838,229 | 9/1974 | Morrell et al. | 179/179 |
| 3,838,232 | 9/1974 | Laing et al. | 179/178 |
| 3,839,605 | 10/1974 | Morrell et al. | 179/178 |
| 3,886,324 | 5/1975 | Hemming | 179/178 |
| 4,032,727 | 6/1977 | Burns, Jr. | 179/178 |

FOREIGN PATENT DOCUMENTS

| 2,014,960 | 3/1970 | Germany | 179/178 |
|---|---|---|---|
| 6,406,018 | 7/1963 | Netherlands | 179/178 |
| 1,180,080 | 12/1967 | United Kingdom | 179/179 |

*Primary Examiner*—Kathleen H. Claffy
*Assistant Examiner*—Randall P. Myers
*Attorney, Agent, or Firm*—Harry L. Newman

[57] ABSTRACT

A quick-release, snap-in bracket assembly for mounting telephone dials within a telephone housing is disclosed. The assembly allows dials of the same or different types to be rapidly mounted within or removed from a telephone housing through use of a pair of mounting members suitably dimensioned and disposed on opposite sides of the dial. Upstanding support members formed within the telephone housing are used to engage the interchangeable mounting members and the related dial attached thereto.

11 Claims, 7 Drawing Figures

4,081,629

SNAP-IN BRACKET FOR MOUNTING A TELEPHONE DIAL WITHIN A TELEPHONE HOUSING

BACKGROUND OF THE INVENTION

1. Field of the Invention

This invention relates to the mounting of telephone dials in a telephone housing, and, in particular, to the mounting of these dials on the support structure of the telephone housing.

2. Description of the Prior Art

Telephone sets have advanced to the state where many interchangeable options fitting within the same basic housing may be provided to the customer when he selects a telephone set. Accordingly, the method of installing and removing these options has also changed due to the need for saving on time, ease of assembly, and expense.

Dial interchangeability in the telephone set has been one area of concern in which a simple but effective mounting technique that allows for the desired savings has not heretofore been obtained. This problem has persisted because of the structural difference between the standardized rotary and pushbutton dials that are being used in telephone sets. The respective heights and widths of the two dials differ and unfortunately, their attachment points do also, making difficult the use of a common support structure that the two dials could attach directly thereto.

In an effort to overcome this dial mounting problem one prior arrangement disclosed in U.S. Pat. No. 3,838,232 issued Sept. 24, 1974 to R. Morrell et al., shows a dial mounting technique whereby either the rotary or the pushbutton dial is mounted in a telephone housing by using a single pair of upstanding brackets secured to the base of the housing a fixed distance apart. The brackets have offset wall portions such that in one related opposed position mounting for the rotary dial is provided, while when the positions of the brackets are reversed, mounting for the pushbutton dial is provided. The offset wall portions have multiple screw-receiving slots formed therein to accommodate the difference in heights between the two dials.

In order to facilitate the mounting and removal of the brackets, the base of the telephone housing includes a pair of bracket-receiving, fixed channel members that are permanently secured thereto. Each channel member has an anchorage at one end and a short flexible retaining member at the other end. Each one of the upstanding brackets is engaged to a channel member by inserting a slot on one edge into the anchorage and then rotating the bracket to snap a tab at the opposite edge under the retaining member.

This arrangement permits the use of just two distinct brackets to mount both the rotary and pushbutton dials but at the same time creates the need to take precautionary measures during the mounting operation so as to insure that the support brackets are installed correctly. Interchanging of the dials would thus appear to be a fairly involved procedure and requires a degree of care that can be prone to error. If, for example, it becomes necessary to replace a dial in the field using the foregoing arrangement, other components within the housing would have to be removed in order to obtain the necessary space to reach under the dial and deflect the retaining member so as to free the brackets. Once the support brackets and dial are removed from the housing as an assembly, the brackets are unscrewed from the dial, their positions interchanged, and then they are refastened to a new dial. Care must be taken to insure that the brackets are oriented in the right direction for mounting in the support channel and that the correct screwreceiving slot in the bracket is used for the dial to be mounted. After the brackets with the dial attached thereto have been mounted in place on the base of the telephone housing, the components that were first removed to provide access are then remounted. Thus from the foregoing, it is seen that while the Morrell and other arrangements may facilitate initial assembly at the factory, they do not facilitate replacement of the dial in the field.

SUMMARY OF THE INVENTION

It is an object of the present invention to provide a simplified mounting arrangement for both types of telephone dials that permits easy assembly and removal from the housing for replacement or access to other components within the telephone housing.

The invention provides a quick release, snap-in mounting assembly which has a pair of mounting members disposed on opposite sides of a telephone dial for attaching said dial to a pair of spaced upstanding support members.

The mounting members for each type of dial are identical to each other but are unique to one type of dial. Thus, one identical pair of mounting members is used for the rotary dial while another identical pair of mounting members is used for the pushbutton dial. This arrangement does not increase the number of piece parts over that required in the previously described prior art arrangement, but by providing mounting members that are unique to each dial, the chances of confusion and error in the assembling of these mounting members to the associated dial are reduced. For release of the mounting members from the support members, a flexible cantilever catch portion of at least one of the mounting members or support members includes a release tab which extends adjacent to the exposed surface of the dial. The rapid removal of the mounting member, including the dial attached thereto from the support members, is accomplished simply by deflecting this accessible release tab by hand.

In accordance with the present invention, one embodiment of the snap-in mounting assembly utilizes a support member of the telephone housing for restraining a generally U-shaped mounting member. The support member includes a catch portion comprising a protrusion having a downwardly facing stop surface. A cooperating catch portion of the U-shaped mounting member comprises an upwardly extending flexible cantilever leg section having an opening that accommodates the protrusion and has a stop surface that is positioned beneath the stop surface on the protrusion. Also included on the support member is a pair of spaced support surfaces on which a cooperating pair of spaced support surfaces of the mounting member are positioned when the opposed stop surfaces are in engagement with one another. Together the interaction between the support surfaces of the support member and the mounting member along with the stop surfaces of the two members combine to provide a secure means for restraining movement of the mounting member in a direction parallel to the height of the wall member.

In another embodiment of the snap-in mounting assembly, a support member is used to restrain an inverted U-shaped mounting member. Formed as a molded detail onto the support member is a box-like housing having a rectangular bore extending generally parallel to the height of the support member and a pair of spaced and recessed support surfaces that are used to uphold a corresponding pair of spaced support surfaces located on the U-shaped mounting member. Also formed as a molded detail onto the support member in the vicinity of the lower end thereof is a flexible cantilever catch portion extending upwardly through the box-like housing into the vicinity of the upper end of the mounting member. This catch portion includes a protrusion while a catch portion of the U-shaped mounting member includes an extended leg section having an opening for accommodating the protrusion, a stop surface on the protrusion engaging an opposed stop surface on the opening. Together the interaction between the support surfaces of the support member and the mounting member along with the stop surfaces of the two members combine to provide a secure means for restraining movement of the mounting member in the direction parallel to the height of the support member.

Another significant advantage realized by the use of the snap-in mounting assembly is the addition of the channel portion which has opposed side walls that extend parallel to the height of the support member. The channel portion has as its function the dual purpose of guiding the mounting member into a nested position with the support member, and restraining movement of the mounting member when the stop surface of the support member is positioned beneath the stop surface of the mounting member, and the mounting member support surfaces are positioned in engagement with the support member support surfaces. This interaction between the channel portion of the support member and the edges of the mounting member provides sufficient coupling to firmly restrain movement of the mounting member in a direction transverse to the height of the support member.

Still another significant advantage of the uniquely constructed snap-in mounting assembly is that the identical mounting members can be suitably dimensioned with a desired offset to accommodate dials with different widths so that the support members within the housing are maintained with a fixed spacing therebetween. Furthermore, as constructed, each mounting member will consistently and reliably locate the dial for which it is designed at the same elevation relative to the telephone housing. In eliminating the need for repositioning, interchanging, or replacing the support structure, a substantial reduction in time and cost is obtained in interchanging dials in the field.

It is thus seen that in accordance with the principles of the present invention, the snap-in mounting assembly embodied herein is not only of simplified and reliable construction, but also allows for the rapid mounting and removal of dials with different dimensions to the same support structure.

Other objects and advantages of this invention will be readily appreciated from consideration of the following specification in connection with the accompanying drawings.

DETAILED DESCRIPTION

Figure 1:
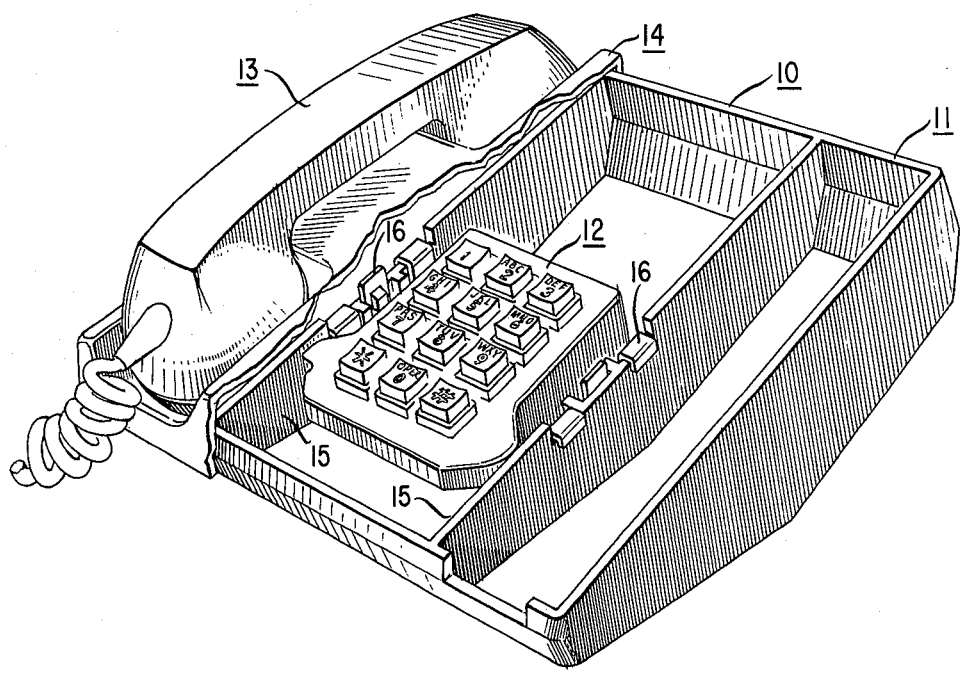
FIG. 1 is a perspective view of a telephone housing with the cover partially broken away showing a pushbutton dial attached to mounting members which are secured to upstanding support members in accordance with the present invention.

FIG. 1 shows a telephone set 10 including the telephone housing 11, a pushbutton dial 12, a handset 13, and a portion of the telephone set cover 14 which has its major portion cut away to show the mounting of the pushbutton dial 12 in the telephone housing 11. The housing 11 is fabricated by molding or the like of a suitable high impact plastic material. Also molded integrally with the housing 11 are upstanding support or wall members 15 which are used for securing a pair of U-shaped dial mounting or bracket members 16 formed from a piece of flexible metal plate or sheet metal material. In accordance with the principles of the present invention, the pushbutton dial 12 is secured to the upstanding wall members 15 by means of the pair of bracket members 16.

Figure 2:
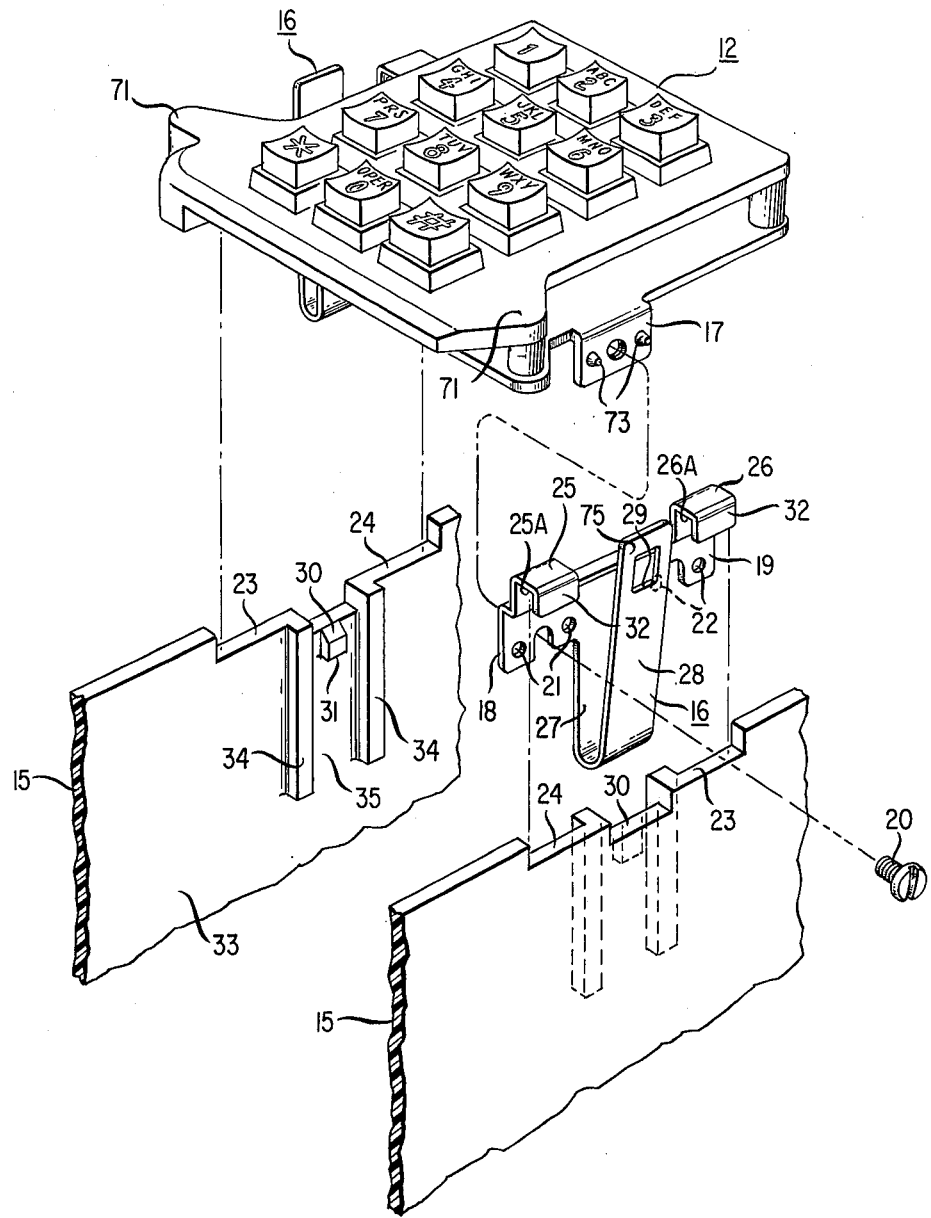
FIG. 2 is an exploded perspective view of the pushbutton dial, the mounting members and the upstanding support members depicted in FIG. 1.

As shown in FIG. 2, the pushbutton dial 12 has a pair of spaced and downwardly extending support tabs 17 (only one shown) which form part of the dial base structure, and are offset relative to the x-axis center line thereof. In addition, the dial 12 has a protruding element 71 adjacent to each support tab 17. As a result, to enable the identical bracket member 16 to be used on both sides of the dial 12, the bracket members are designed with two fastener-receiver sections 18 and 19 extending laterally from an inner leg section 27. The bracket members 16 are installed as an opposed pair and the fastener-receiver sections 18 and 19 alternated on opposite sides of the pushbutton dial. Thus, fastener-receiver section 18 is used in attaching one bracket member 16 to the right side of the dial 12, while fastener-receiver section 19 is used in attaching the other bracket member to the left side of the dial. This maintains the same displacement relative to the x-axis center line of the dial 12 for both bracket members 16 while allowing easy access for inserting a threaded fastener, such as screw 20. It is thus seen that this type of mounting member can be designed with fastener-receiver sections 18 and 19 having any necessary spacing to accommodate the installation of other dials with support tabs that vary relative to the center line of the x-axis of the dials. Accordingly, no change to the support member or the position of its corresponding catch portion is necessary.

The fastener-receiver sections 18 and 19 each have two apertures 21 and 22 respectively, to align with correspondingly positioned detents 73 that are formed on the outer surface of each extending support tab 17 (one shown). This arrangement of apertures and detents insures the desired permanent positional relationship between the extended support tab 17 and the component bracket 16.

Respectively upstanding from the fastener-receiver sections 18 and 19 are inverted U-shaped wall engaging sections 25 and 26 having horizontally extending support surfaces 25A and 26A. The support surfaces 25A and 26A are adapted to rest on a pair of spaced support surfaces 23 and 24 at the upper end of the associated wall member 15.

A cantilever catch portion 28 of the bracket member 16 extends upwardly from the lower end of the inner leg section 27 between the spaced wall engaging sections 25 and 26. The catch portion 28 has an opening adjacent the free end thereof which provides a stop surface 29 that extends generally parallel to and faces in the opposite direction to the spaced support surfaces 25A and 26A. In addition, the free end of the catch portion 28 comprises a release tab 75 that extends generally perpendicular to the support surfaces 25A and 26A and adjacent to the upper surface of the dial 12.

Located between the spaced support surfaces 23 and 24 on the wall member 15, is a protruding catch portion 30 which is formed as a molded detail. This catch portion 30 includes a stop surface 31 which faces in an opposite direction and extends in a generally parallel plane to the spaced support surfaces 23 and 24. It is seen that when the bracket member 16 support surfaces 25A and 26A are positioned in engagement with the wall member 15 support surfaces 23 and 24, the stop surface 29 of the bracket member is also positioned beneath the stop surface 31 of the wall member 15. The resulting interaction between the support surfaces 25 and 26 of the bracket member 16 and the support surfaces 23 and 24 of the wall member 15 along with the two stop surfaces 29 and 31 are the means of restraining movement of the bracket member 16 in the direction parallel to the height of the wall member 15.

Each catch portion 28 on the bracket member 16 is designed so that it extends outward from the inner leg section 27 such that the upper end of the catch portion when deflected a short distance inward toward the inner leg section 27, is biased against the adjacent wall of the upstanding wall member 15. A hook portion 32 of the component bracket member 16, located at the end of each wall engaging section 25 and 26 and extending downward in a direction normal to the support surfaces 25A and 26A, retains this biased condition by holding the opposed wall of the upstanding wall member 15. This interaction between the upstanding wall members 15 and the pair of mutually disposed bracket members 16 securing the pushbutton dial 12 will restrain movement of the dial in a direction normal to side wall surface 33 of the upstanding wall members 15.

A pair of spaced ribs 34 extend from the side wall surface 33 to provide a channel portion 35 which extends generally parallel to the height of the wall member 15. The channel portion 35 guides the edges of the catch portion 28 of the bracket member 16 into a nested position with the upstanding wall member 15. Once the stop surface 31 of the wall member 15 is positioned beneath the stop surface 29 of the bracket member 16, and the bracket member support surfaces 25A and 26A are positioned in engagement with the wall member support surfaces 23 and 24, the interaction between the channel portion 35 of the wall member 15 and edges of the catch portion 28 of the bracket member 16 provides sufficient coupling to firmly restrain movement of the bracket member 16 in the plane of the wall member 15 transverse to its height.

In order to release the pair of bracket members 16, and the pushbutton dial 12 secured thereto from the associated upstanding wall members 15, a squeezing force is exerted on the two exposed release tabs 75 of the catch portions 28 of the bracket member 16 with the thumb and middle finger. This defeats the biasing force exerted on the wall member 15 by the catch portion 28 of the bracket member 16, thereby releasing the respective stop surfaces on the bracket members 16 from the stop surface on the wall member 15. The dial 12 is then removed from the telephone housing by lifting in an upward direction while applying the necessary squeezing force.

Figure 4:
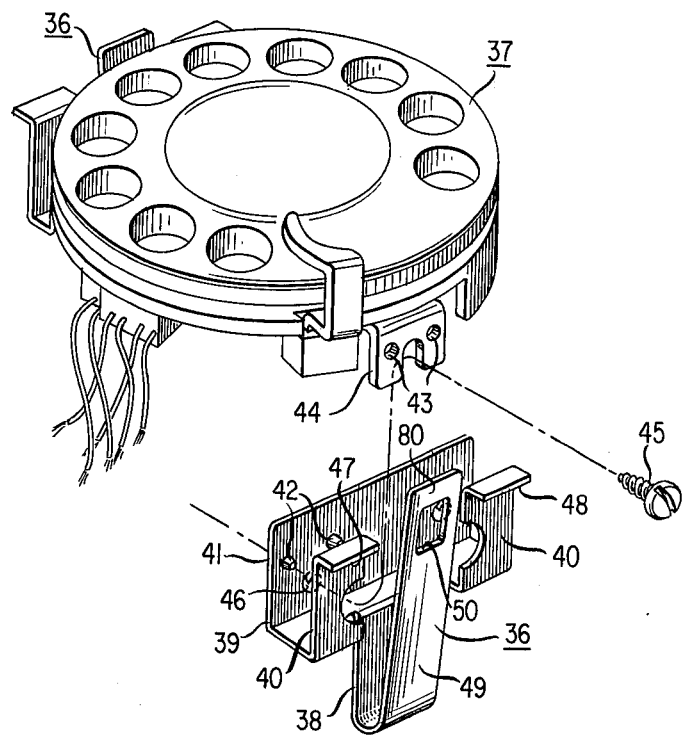
FIG. 4 is an exploded perspective view of a rotary dial and related mounting members which are secured to upstanding support members as depicted in FIG. 2.
Figure 5:
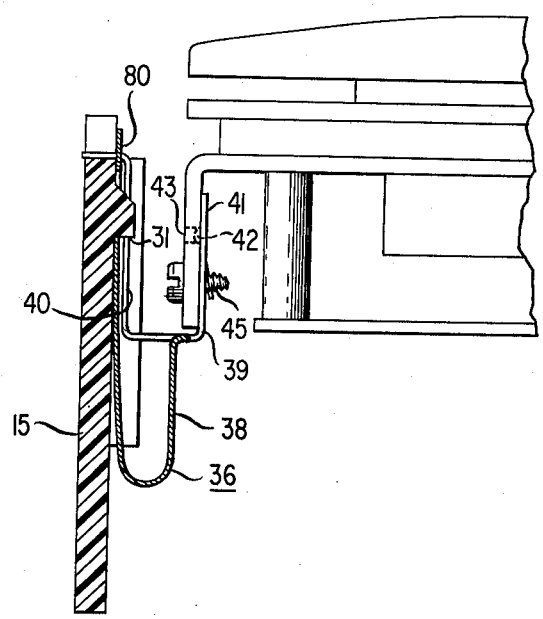
FIG. 5 is an enlarged fragmentary side elevation view, partially in section, illustrating the rotary dial and mounting members of FIG. 4, and in particular, shows the mounting members as secured to the upstanding support member depicted in FIG. 2.

Referring now to FIGS. 4 and 5, it is seen that a pair of bracket members 36 is used to mount a rotary dial 37 on an upstanding wall member 15 as depicted in FIG. 2. As seen in FIG. 4, the bracket member 36 is formed generally into a U shape from a piece of flexible metal plate or sheet metal material. An inner leg section 38 of the bracket member 36 is of a truncated length terminating in a bight that provides a second U-shaped portion with opposed legs 39 and 40. Located on leg 39 are two fastener-receiver sections 41 (only one shown) which have detents 42 that are used to align with correspondingly positioned apertures 43 formed in each extending support tab 44 (only one shown) on the rotary dial 37. Each fastener-receiver section 41 of bracket member 36 is adapted for securement by means of a threaded fastener, such as a screw 45. The fastener-receiver section 41 of the component bracket member 36 has a die-formed single threaded hole 46 that eliminates the need for a separate locknut in attaching the bracket member 36. The threaded fastener arrangement along with that of the detents and apertures insures the desired permanent positional relationship between the extended support tab 44 and the bracket member 36.

Leg 40 of the bracket member 36, formed with a slot to allow for ease of inserting a threaded fastener, has located at its upper end two spaced support surfaces 47 and 48 extending normal thereto. These support surfaces 47 and 48 rest on corresponding support surfaces 24 and 23 of the upstanding wall member 15 of FIG. 2, thereby upholding the bracket member 36 at a fixed position with respect to the height of the upstanding wall member 15.

A flexible cantilever catch portion 49 of the bracket member 36 extends upwardly from the lower end of the inner leg section 38 between the spaced support surfaces 47 and 48. The catch portion 49 has an opening adjacent the free end thereof which provides a stop surface 50 that extends generally parallel to and faces in the opposite direction to the spaced support surfaces 47 and 48. In addition, the free end of the catch portion 49 comprises a release tab 80 that extends generally perpendicular to the support surfaces 47 and 48 and adjacent to the upper surface of the dial 37.

The bracket members 36 illustrated in FIG. 4 engage the upstanding wall member 15, shown in FIG. 2, in much the same manner as the bracket members 16, also of FIG. 2. The means of restraining movement of bracket member 36 of FIG. 4 in the direction parallel to the height of the wall member 15 of FIG. 2 is the same as the bracket member 16 of FIG. 2 which has been previously described. The means of restraining movement of the bracket member 36 of FIG. 4 in a direction in the plane of and transverse to the height of the wall member 15 of FIG. 2 is the same as for bracket member 16 of FIG. 2 which has also been previously described. Therefore, these movement restraining means are not repeated here.

The means by which bracket member 36 of FIG. 4 differs from bracket member 15 of FIG. 2 are those means through which movement of the dial is restrained in a direction normal to the side wall surfaces of an upstanding wall member, such as wall member 15 shown in FIGS. 2 and 5. Each leg 40 of the bracket member 36 is designed so that it flexes outward from the fastener-receiver sections 41 in the same manner that the catch portion 49 flexes outward. The total dimension of rotary dial 37 and the pair of mutually disposed bracket members 36 is such that when inserted between the two upstanding wall members 15 of FIG. 2, the legs 40 of the bracket members 36 are spring biased against the adjacent walls of the upstanding wall member 15 of FIGS. 2 and 5. The catch portion 49 of the bracket member 36 is also in a spring biased position since it too is forced into an upright position from its normal outward flexed position. The interaction between the stop surface 31 of the wall member 15 of FIGS. 2 and 5 and the stop surface 50 of the bracket member 36 of FIG. 4 retains this biased condition by preventing movement of the bracket members 36 in the direction of the height of the wall members 15 of FIG. 2.

Figure 3:
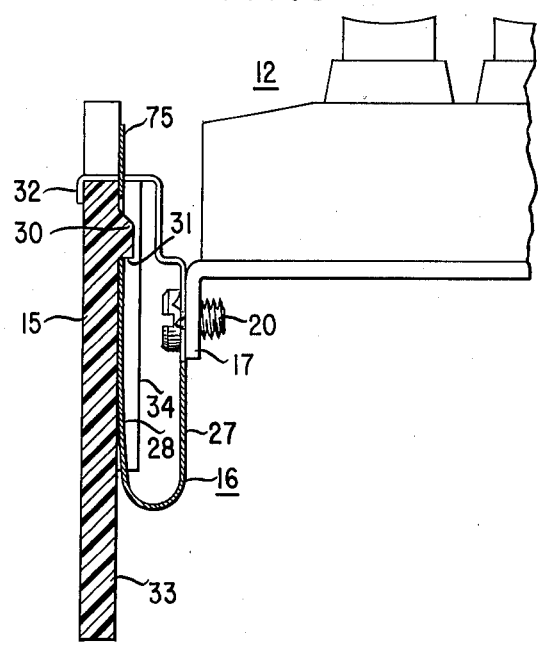
FIG. 3 is an enlarged fragmentary side elevation view, partially in section, illustrating the pushbutton dial and mounting members of FIG. 2, and in particular, shows the mounting members as secured to the upstanding wall members depicted in FIG. 2.

It should be understood from the foregoing disclosure that the bracket member 36 of FIGS. 4 and 5 simply illustrates a modification of the bracket member 16 of FIGS. 2 and 3 and that numerous modifications or alterations may be made therein without departing from the spirit and scope of the invention.

Figure 6:
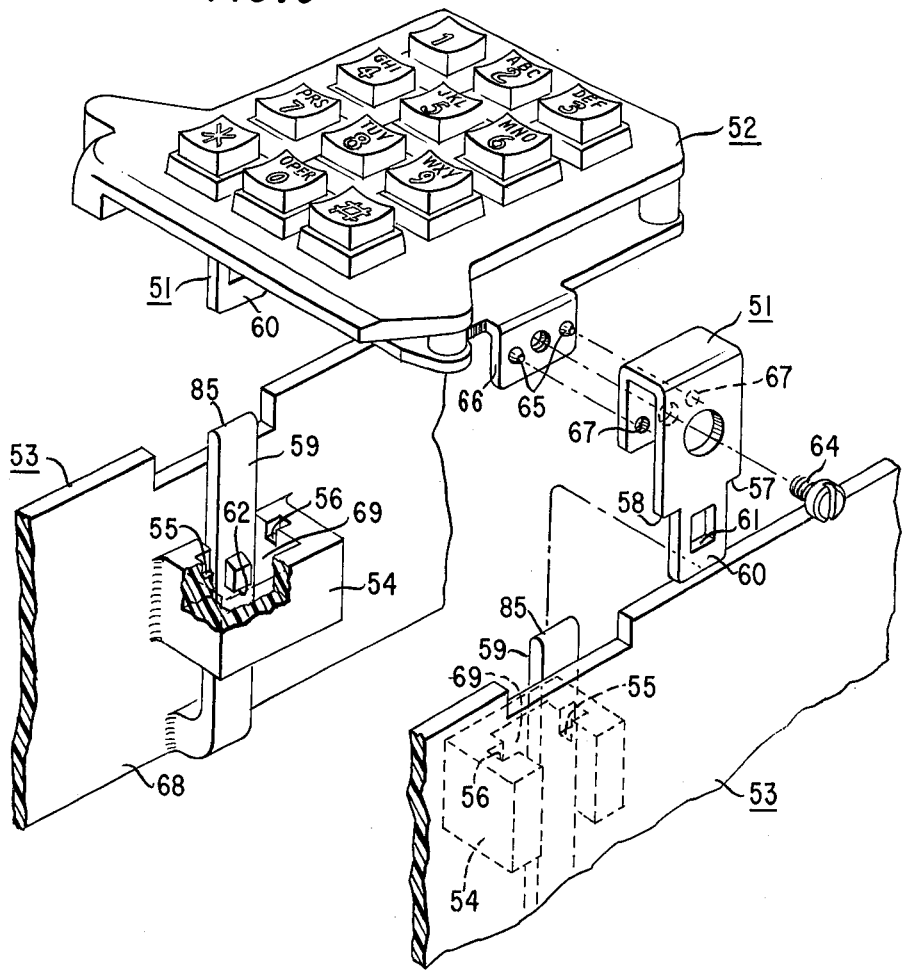
FIG. 6 is an exploded perspective view of a pushbutton dial, alternative mounting members, and upstanding support members within a telephone housing.
Figure 7:
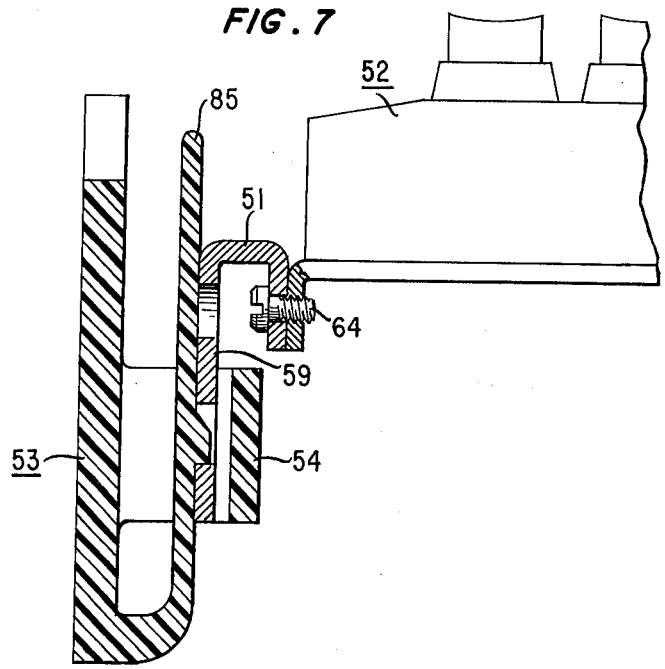
FIG. 7 is an enlarged fragmentary side elevation view, partially in section, illustrating the pushbutton dial, mounting member and support member of FIG. 6, and a particular, shows the mounting member as secured to the upstanding support member.

Another such modification is illustrated in FIGS. 6 and 7 showing a pair of inverted U-shaped bracket members 51 being used to mount a pushbutton dial 52 on upstanding wall members 53 of a telephone housing molded of plastic material. Formed as a molded detail onto the wall member 53 is a box-like housing 54 having a rectangular bore extending generally parallel to the height of the wall member. As seen in FIG. 6, a pair of spaced and recessed support surfaces 55 and 56, also on the box-like housing 54 but extending generally orthogonal to the height of the wall member 53, are used to uphold a corresponding pair of spaced support surfaces 57 and 58 located on the bracket member 51. Also formed as a molded detail onto the wall member 53 in the vicinity of the lower end thereof is a flexible cantilever catch portion 59 extending generally normal to the bottom surface of the wall member and through the rectangular bore of the box-like housing 54. The free end of the catch portion 59 comprises release tab 85 that extends generally perpendicular to the support surfaces 57 and 58 and adjacent to the upper surface of the wall member 53. A catch portion 60 of the bracket member 51 includes the extended leg section having an opening which forms a stop surface 61 for engaging an opposed stop surface 62 located on the catch portion 59 of the wall member 53.

Formed from a piece of metal sheet or plate, each bracket member 51 is adapted for securement to the pushbutton dial 52 through use of a threaded fastener, such as screw 64. Detents 65 on the extending support tab 66 of the pushbutton dial 52, aligning with corresponding apertures 67 on the bracket member 51, further assures the correct set of the bracket member 51 to the support tab 66.

Once the bracket member support surfaces 57 and 58 are positioned in engagement with the recessed support surfaces 55 and 56 on the box-like housing 54, and the stop surface 61 of the bracket member 51 is positioned beneath the stop surface 62 on the catch portion 59 of the wall member 53, a secure means for restraining movement of the bracket member 51 in a direction parallel to the height of wall member 53 is obtained. Also, since each catch portion 59 on the wall member 53 is designed so that it flexes outward from the side wall surface 68 of the upstanding wall member 53, and since the support surfaces 55 and 56 on the box-like housing 54 are recessed, the opposed side walls created thereby along with the spring biased condition of the catch portion 59 provide the means for restraining movement of the bracket member 51 in a direction normal to the side wall surface 68 of the upstanding wall member 53. Finally, opposed side walls formed by the rectangular bore in the box-like housing 54 make up a channel portion 69 that extends parallel to the height of the wall member 53. This channel portion 69 guides the edges of the catch portion 60 of the bracket member 51 into a position whereby the stop surface 62 on the catch portion 59 of the wall member 53 will engage the stop surface 61 on the catch portion 60 of the bracket member 51. Once the two stop surfaces 61 and 62 are engaged, the channel portion 69, because of a close tolerance between its opposed side walls and the edges of the catch portion 60 on the bracket member 51, will firmly restrain movement of the bracket member 51 in a direction in the plane of and transverse to the height of the wall member 53.

For removal of the snap-in bracket assembly and pushbutton dial 52 attached thereto, the two mutually disposed release tabs 85 of the catch portions 59 of the wall members 53 extending adjacent to the upper surface of the dial 52 are deflected outward toward the upstanding wall member 53. This defeats the biasing force exerted by the catch portion 59 of the wall member 53 on the bracket member 51. The stop surfaces 61 on the bracket members 51 are thereby released from the stop surfaces 62 of the wall members 53 for easy removal of the pushbutton dial 52 by lifting in an upward direction.

Obviously, many modifications and variations of the present invention are possible in light of the above teachings. It is therefore to be understood that within the scope of the appended claims the invention may be practiced otherwise than as specifically described.

What is claimed is:

1. An assembly for mounting a dial within a telephone housing comprising a pair of spaced upstanding support members extending in generally parallel planes, each support member having a height and including a portion having a support surface at the upper end thereof extending generally orthogonal to the height of the support member, and a catch portion located adjacent to the support surface, the catch portion including a stop surface facing in the opposite direction to the support surface;

a dial having a pair of mounting members disposed on opposite sides thereof for securing the dial between the support members with a surface of the dial exposed, the mounting members being identical to one another and each mounting member including a support surface for resting on the support surface of the associated support member, and a catch portion located adjacent to the support surface, the catch portion including a stop surface facing in the opposite direction to the support surface and being positioned in engagement with the stop surface of the associated support member when the mounting member support surface is positioned in engagement with the support member support surface;

the pair of support members providing the total support for the dial and the interaction of the support members with the pair of mounting members of and by itself securing the dial in place, and the catch portion of at least one of the support members or mounting members being a flexible cantilever element, the free end of which includes a release tab that extends generally perpendicular to the support surface thereof and adjacent to the exposed surface of the dial so as to be readily accessible and deflectable by hand.

2. A mounting assembly as in claim 1 wherein at least one of the support members includes a channel that extends generally parallel to the height of the support member and within which the catch portion of the support member is situated, the channel cooperating with the associated dial mounting member to guide the mounting member into a nested position with the support member and restrain the mounting member in the plane of the support member transverse to its height.

3. A mounting assembly as in claim 2 wherein each support member includes a pair of support surfaces that straddle the catch portion and are immediately adjacent thereto.

4. A mounting assembly as in claim 2 wherein the interaction between the channel portion and the edges of the mounting member is the sole means of restraining movement of the mounting member in a direction transverse to the height of the support member.

5. A mounting assembly as in claim 1 wherein the interaction between the support surfaces and the stop surfaces is the sole means of restraining movement of the mounting member in a direction generally parallel to the height of the mounting member.

6. A mounting assembly as in claim 1 wherein the catch portion on the support member is a protruding element one side of which forms a stop surface and the catch portion of the mounting member has an opening for receiving the protruding element of the catch portion of the support member, one edge of the opening providing a stop surface that engages the stop surface formed by the protruding element.

7. A mounting assembly as in claim 1 wherein each mounting member is a resilient element formed generally into a U shape, and each mounting member includes one leg section having two dial fastener-receiver sections therein, the leg section extending upward and terminating in a pair of spaced support surfaces and the other leg section formed into the catch portion having the release tab.

8. A mounting assembly as in claim 7 wherein each fastener-receiver section has aligning fastener-receiver apertures and an opening that allow a threaded fastener to extend therethrough so as to firmly align and secure the mounting member to an extending support tab of the dial.

9. A mounting assembly as in claim 1 wherein each mounting member is a resilient element formed generally into a U shape, each mounting member including one leg section being formed into the catch portion having the release tab and the other leg section being of a truncated length, terminating in a bight that provides a second U-shaped portion, one leg section of this second U-shaped portion terminating in two dial fastener-receiver sections.

10. A mounting assembly as in claim 9 wherein each fastener-receiver section has aligning fastener-receiver detents formed therein along with a fastener-engaging single threaded hole so as to allow a threaded fastener to extend therethrough firmly aligning and securing the mounting member to an extended support tab of a dial.

11. The mounting assembly as described in claim 1 wherein the mounting members include an offset to accommodate a dial of a different width so as to allow the support members to be maintained with a fixed spacing therebetween.

* * * * *